United States Patent [19]
Gove

[11] Patent Number: 6,134,392
[45] Date of Patent: Oct. 17, 2000

[54] CAMERA WITH USER OPERABLE INPUT DEVICE

[75] Inventor: Robert John Gove, Plano, Tex.

[73] Assignee: Texas Instruments Incorporated, Dallas, Tex.

[21] Appl. No.: 07/765,757

[22] Filed: Sep. 26, 1991

[51] Int. Cl.[7] .............. G03B 17/00; G03B 17/24
[52] U.S. Cl. .............. 396/296; 396/297; 396/299; 396/312; 396/313; 345/173
[58] Field of Search .................. 354/105, 106, 354/109, 75, 76; 340/706, 707; 358/450, 462, 464; 345/104, 173

[56] References Cited

U.S. PATENT DOCUMENTS

| | | | |
|---|---|---|---|
| 4,020,492 | 4/1977 | Sumio | 354/105 X |
| 4,330,186 | 5/1982 | Hatteri | 354/106 |
| 4,449,805 | 5/1984 | Sakurada et al. | 354/105 |
| 4,742,369 | 5/1988 | Ishii et al. | 354/106 X |
| 4,814,760 | 3/1989 | Johnson et al. | 340/706 X |
| 4,983,996 | 1/1991 | Kinoshita | 354/106 X |
| 5,103,250 | 4/1992 | Arifuku et al. | 354/106 |
| 5,162,830 | 11/1992 | Schappler et al. | 354/106 |

*Primary Examiner*—Alan A. Mathews
*Attorney, Agent, or Firm*—Robert L. Troike; Frederick J. Telecky, Jr.

[57] ABSTRACT

A camera has a user-operable input device, e.g., a writing pad, attached to its body. A user inputs information to be superimposed on a photographic negative onto the user-operable input device. A processor is connected to the user-operable input device. A display is also attached to the camera body and is connected to the processor. The processor transmits the information entered onto the user-operable input device to the display. When the negative is exposed, the display information is superimposed with the image of the subject being photographed. Thus, a user may enter a caption describing the subject directly onto the photograph.

4 Claims, 8 Drawing Sheets

CAMERA WITH USER OPERABLE INPUT DEVICE

NOTICE (C) Copyright Texas Instruments Incorporated 1991. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

BACKGROUND OF THE INVENTION

1. Field of the Invention

This invention relates to photographic equipment and in particular to a single lens reflex (SLR) camera with photographer-created text interactively entered onto the photograph.

2. Description of the Related Art

Existing cameras, ranging from 35 mm still cameras to full motion video cameras, have excellent visual information collection and documentation capabilities. However, nonvisual information, e.g., "This is a picture of Aunt Alice at Clear Lake", either is not documented, relying on the memory of the viewer of the photograph, or is sometimes scribbled on the back of the photograph. This process of taking pictures, developing them, and finally documenting the cognizant information can be tedious and lead to omission of information or mistaken information, e.g., two lakes may look very similar to the viewer of the photograph.

Certain cameras have a date stamp documenting feature. In these cameras an internal clock drives a digital display which the photographer can optionally have exposed onto the film, thereby documenting the date and time the photograph was taken. However, these cameras do not provide a means for further identifying the subject of the photograph.

Accordingly, improvements which overcome any or all of the problems discussed above are presently desirable.

SUMMARY OF THE INVENTION

A camera has a user-operable input device, e.g., a writing pad, attached to its body. A user inputs information to be superimposed on a photographic negative onto the user-operable input device. A processor is connected to the user-operable input device. A display is also attached to the camera body and is connected to the processor. In one embodiment, the display is located on the camera back, at the location where the film is exposed. The processor transmits the information entered onto the user-operable input device to the display, where it is displayed immediately before or after the negative is exposed to the image being photographed, thus superimposing the information entered on the user-operable input device with the image of the subject being photographed. Thus, a user may enter a caption describing the subject directly onto the photograph.

In another embodiment the image from the display is merged with image captured through the lens. The display information is reflected by a beam-splitter, the image from the lens is propagated through the same beam-splitter, and the image output from the beam-splitter is a composite of the two images. This composite image is used to expose the film, thereby causing the film negative to contain both the image of the subject and the text describing the subject.

It is an object of the invention to enable the user of a camera to place captions onto photographs taken with the camera at the time the film is exposed.

Other objects, features, and advantages of the invention will become more apparent from the following description when taken in conjunction with the accompanying drawings.

BRIEF DESCRIPTION OF THE DRAWINGS

In the drawings.

Corresponding numerals and symbols in the different figures refer to corresponding parts unless otherwise indicated.

DETAILED DESCRIPTION OF PREFERRED EMBODIMENTS

Figure 1:
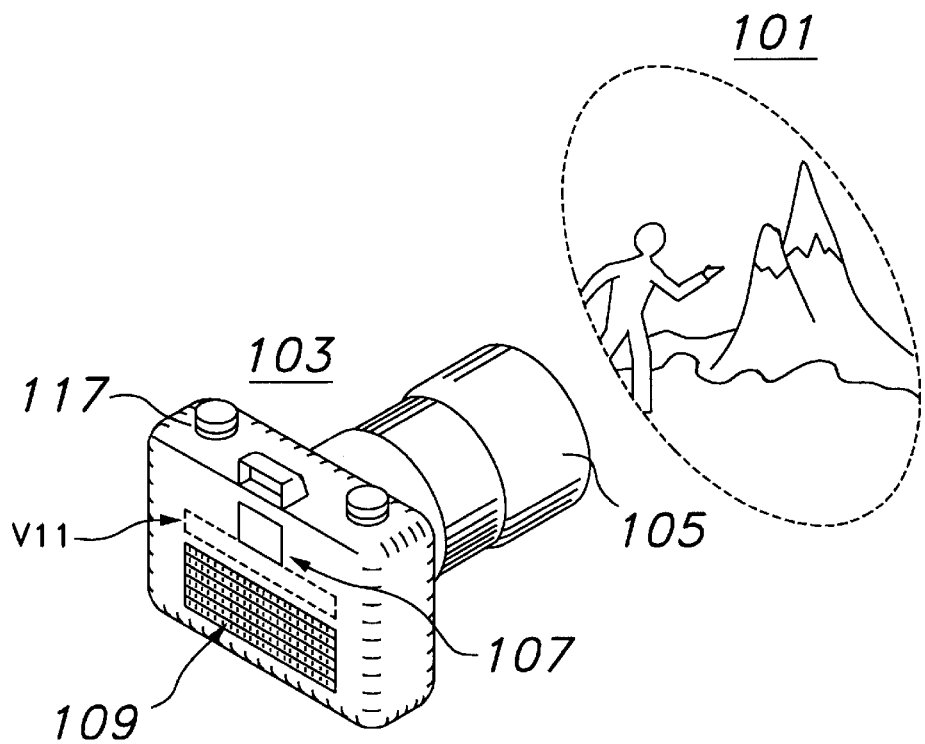
FIG. 1 shows a single lens reflex camera with a writing pad according to the preferred embodiment.

FIG. 1 shows a preferred embodiment of camera 103 used to photograph subject 101. The camera 103 consists of lens 105 aimed at the subject 101 and attached to camera body 117. Located on the back of camera 103 is viewfinder 107, user-operable input device 109, and optional display 111. The photographer enters a caption to be placed onto a photograph by entering information using the user-operable input device 109. The caption is entered onto the photograph by exposing the film, and is displayed on the display 111 and in viewfinder 107.

In a preferred embodiment the user-operable input device 109 is a writing pad. However, alternate embodiments will be apparent to a person skilled in the art, e.g., user-operable input devices such as microphones, alphanumeric keypads, and electronic video sources.

Figure 2A:
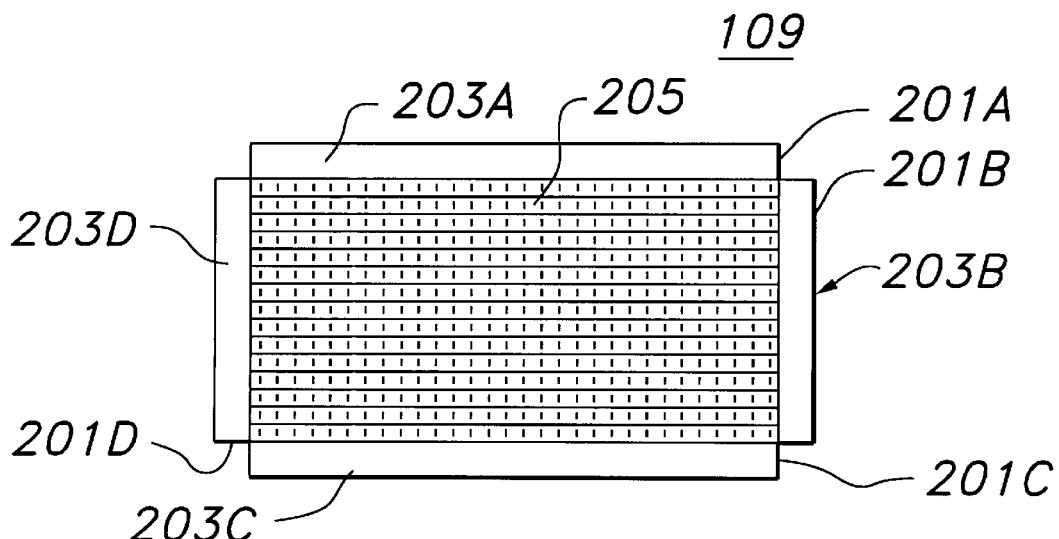
FIGS. 2(a), 2(b), and 2(c) show a preferred embodiment writing pad.
Figures 2B, 2C:
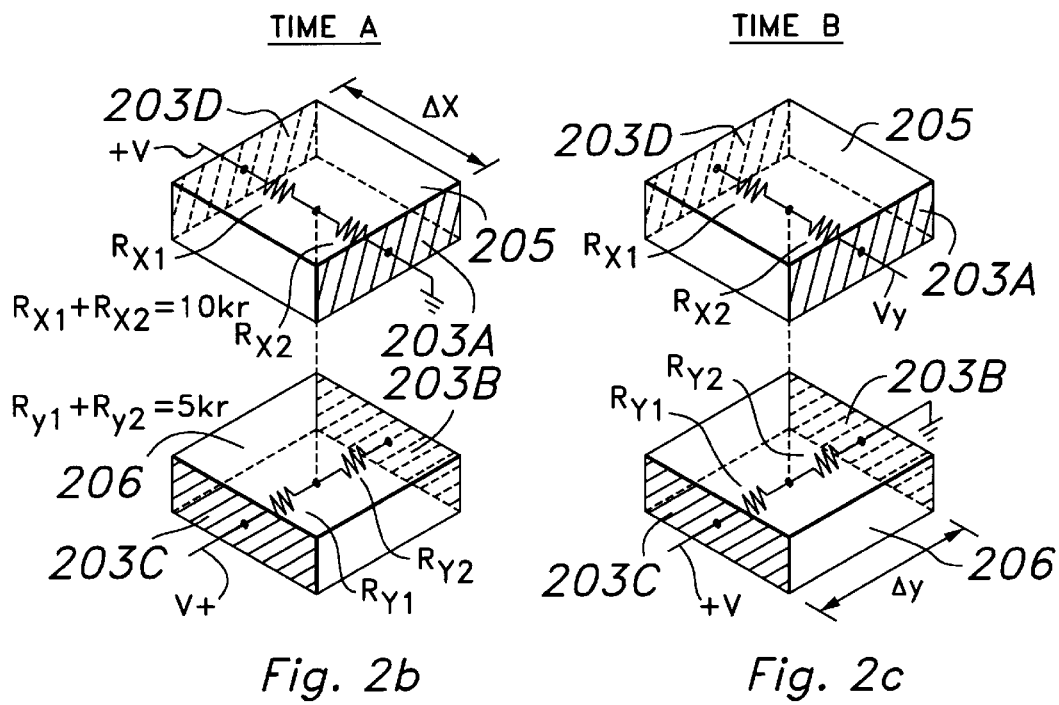

FIG. 2 is a detail of a preferred embodiment in which the user-operable input device 109 is a writing pad. The writing pad 109 consists of a matrix of touch sensitive cells. As a person skilled in the art knows, a grid of touch sensitive cells can be formed in many ways. In one embodiment the writing pad 109 consists of a top layer of resistive material 205 attached to connectors 203A and 203D, and a bottom layer of resistive material 206 attached to connectors 203B and 203C. These connectors are attached to external connectors 201A through 201D, respectively. When the photographer presses a pen against the layer 205 a connection is made between it and the layer 206 to close the circuits between connectors 201A through 201D, as shown in FIG. 2(b) and FIG. 2(c). The point at which the layers 205 and 206 are pressed together is indicated by line 207. The total resistance in the X direction of either layer is $R_{xt}$. Similarly, the total resistance in the Y direction is $R_{yt}$. In FIG. 2(b), X coordinate of the point indicated by line 207 is determined. Terminal 201D is connected to known voltage $V^+$ and terminal 201A is connected to ground. Terminal 201C is connected to $V_x$. The layers 205 and 206 are of uniform resistivity. Therefore, $V_x$ is proportional to the distance between point 207 and terminal 203D. In FIG. 2(c), terminals 203C and 203B are connected to V⁺ and ground, respectively, and terminal 203A is connected to $V_y$. The voltage $V_y$ is proportional to the distance between point 207 and terminal 203C. Thus, $V_x$ and $V_y$ can be used to determine the X and Y coordinates of point 207. The connections to terminals 201A through 201D are changed externally between time A and time B, so that both X and Y coordinates may be determined.

The photographer creates a caption for the photograph by moving a pencil, or other point, across the writing pad. An erasure mode is activated by stroking a specific region of the writing pad 103, e.g., the upper left corner, to toggle modes. If a mistake is made, the photographer toggles the drawing mode, which "hides" the error. Then the photographer flips the mode to continue drawing.

The photographer can also use the writing pad 109 to create graphical symbols, e.g., pointers and arrows, to assist the information delivery. In certain commercial uses of photography, this is a useful feature for documenting the contents of photographs, i.e., insurance adjusters can "highlight" problem areas while taking the picture. This enables the adjuster to more easily identify objects in the photographs after developing the film.

Another application is one in which the marks made on the writing pad 109 are used to align a series of photographs. For example, if a series of pictures are used to create a panoramic view of a horizon, a mark can be used to indicate the vertical position of the horizon and another mark to indicate a landmark which indicates the horizontal location of the picture. These marks can then be used to line up the camera for the next frame in the panorama.

In a less expensive embodiment the writing pad 109 is used by the user to create one character at a time. These characters are sequentially entered into a buffer (not shown), and displayed on an optional external display 111. As an alternative, an alpha-numeric key pad placed on the camera's back could perform this one-character at-a-time input function.

Figure 3:
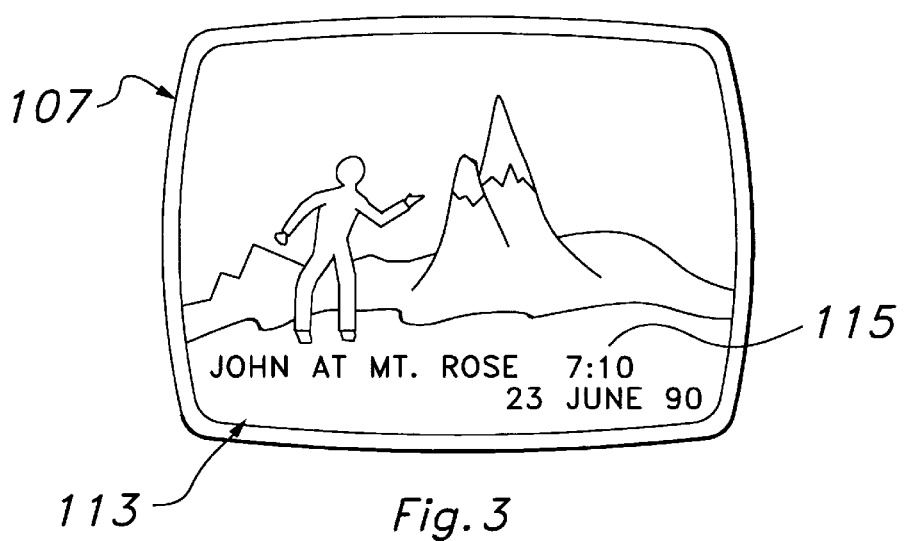
FIG. 3 shows a view finder of a preferred embodiment camera, with information about a photograph superimposed on the image of the subject of the photograph.

FIG. 3 shows a detail of viewfinder 107. It shows the bitmap 113 created by the photographer on the writing pad 109 superimposed on the image of subject 101. Furthermore, it shows a date/time 115 generated by an internal clock (not shown).

Figure 4A:
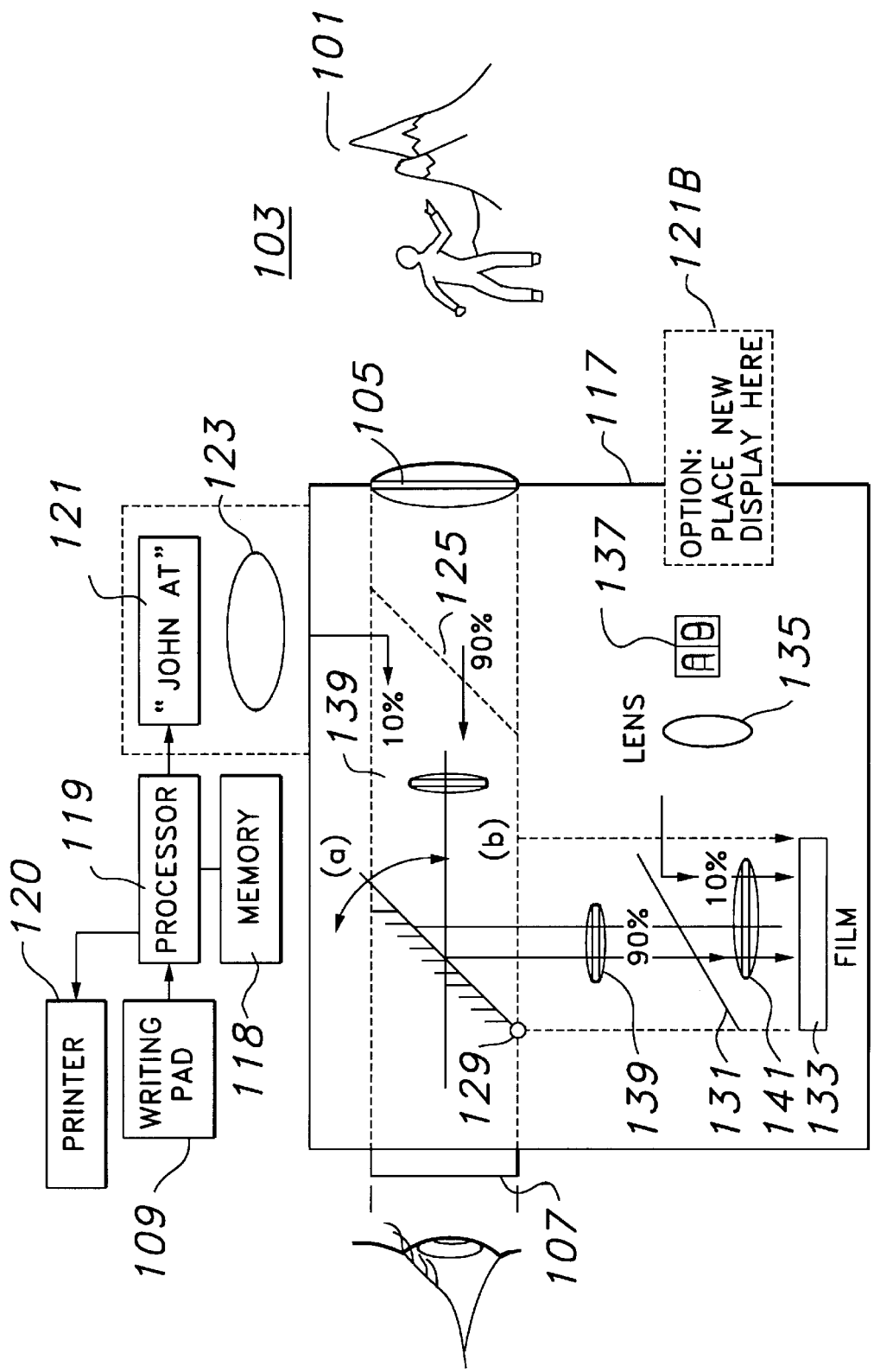
FIGS. 4(A) and 4(B) show a preferred embodiment for optical photography cameras.

FIG. 4(a) shows one embodiment of modifications to a single lens reflex camera. In this embodiment the user-created caption is displayed in the viewfinder 107. The output of writing pad 109 is connected to a processor 119 which samples the writing pad and converts the information entered on writing pad 109 into signals which display the information on display 121. One task of processor 119 is to change the external connections to writing pad 109 between times A and B, so that both X and Y coordinates may be determined.

The light emitted from display 121 is refracted through lens 123 and reflected by beam-splitter 125. The image from the subject is projected through lens 105 and propagated through beam-splitter 125, such that the light rays 139 emitting from beam-splitter 125 is 90% light from subject 101 and 10% light from display 121.

Mirror 127 is connected to the camera body 117 at fulcrum 129. Mirror 127 flips between position (a) and position (b). The mirror 127 is at position (b) during the composition phase of the photographic process and at position (a) during the film exposing phase.

When the mirror 127 is at position (b) the light rays 135 composed from display 121 and subject 101, are propagated to viewfinder 107. However, when the mirror 127 is at position (a) the light rays 139 composed from display 121 and subject 101, are reflected by mirror 127 and propagated through beam-splitter 131 onto a film 133, thus exposing the film 133.

Optionally, an image is derived from date/time stamp display 137 is combined with the light rays 139 by refracting the image through lens 135 and reflecting the light rays 139 on beam-splitter 131, while propagating light rays 139 through beam-splitter 131, thereby forming a combined image represented by light rays 141, which includes the image of the subject 101, the image of display 121, and the image of date/time stamp display 137.

Optionally, the information display 121 could be located next date/time stamp display 137, as shown by block 121B. In this option, block 121B is connected to processor 119 (this connection is not shown).

Printer 120 and memory 118 are optional pieces of equipment which may be connected to processor 119. The memory 118 stores a table of the captions for each frame in a roll of film. The memory 118 can also store logos, e.g, company trademarks, to be entered onto every picture taken. Printer 120 is operable to print out a log of the pictures in a roll of film.

Figure 4B:
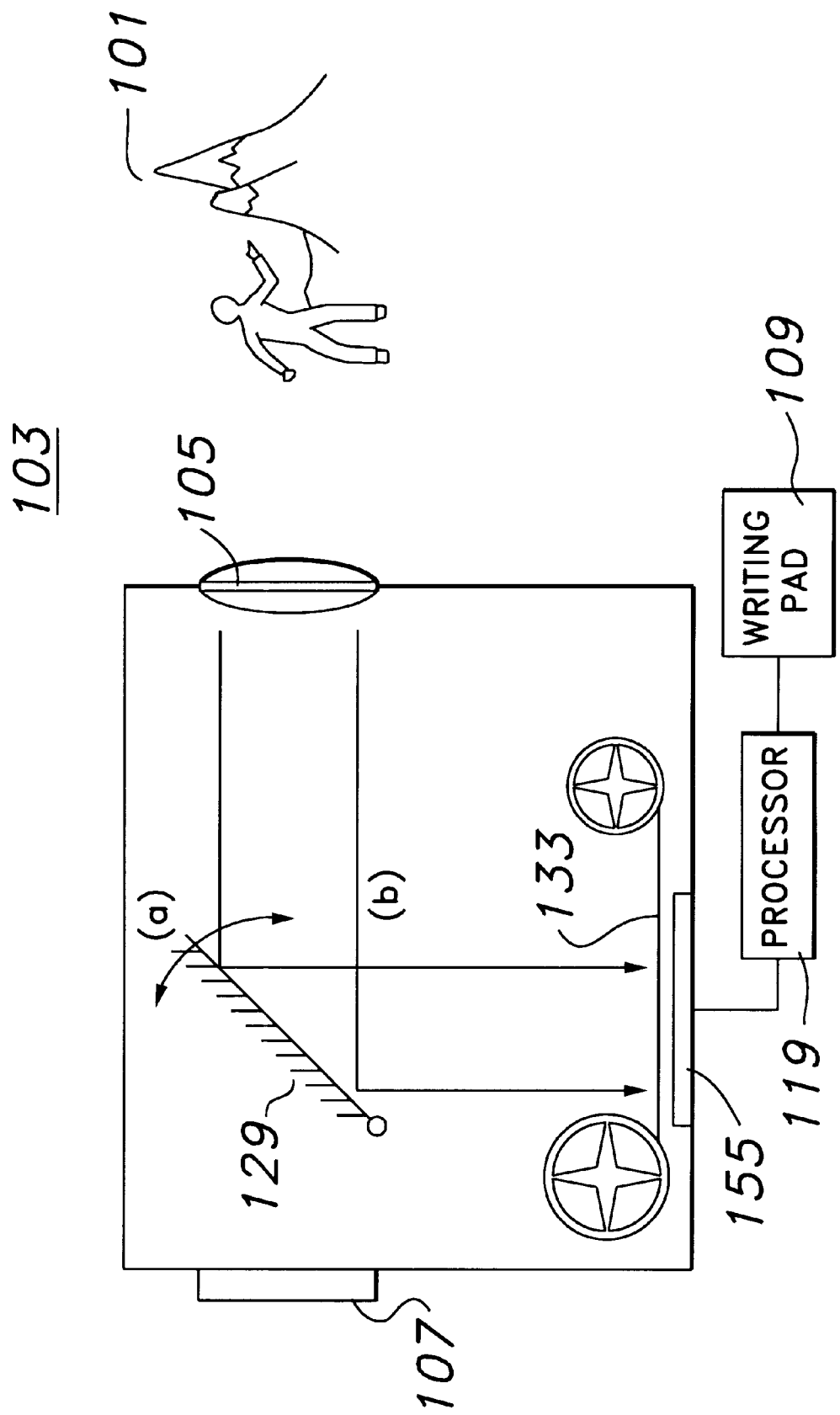

An alternative embodiment is shown in FIG. 4(b). As in FIG. 4(a), the writing pad 109 is connected to processor 119. Processor 119 is connected to light emitting device 155, e.g., an array of light emitting diodes. The light emitting device 155 is located adjacent to the film 133 at the location at which the film is exposed. When the film 133 is exposed, or immediately before or after the film is exposed, the film is exposed by the light emitting device 155 so that the user created caption is entered onto the photograph. Note that in this embodiment an optional external display 111 is provided for the operator to verify correct data entry prior to film exposure.

For ease of manufacture and ease of retrofitting existing camera equipment, in the embodiment shown in FIG. 4(b), writing pad 109, processor 119, light emitting device 155, and optional external display 111, are all placed on the camera back. Thus, an existing camera can be retrofitted by replacing the back on the camera with a back which contains elements 109, 119, 155 and 111.

Figure 5:
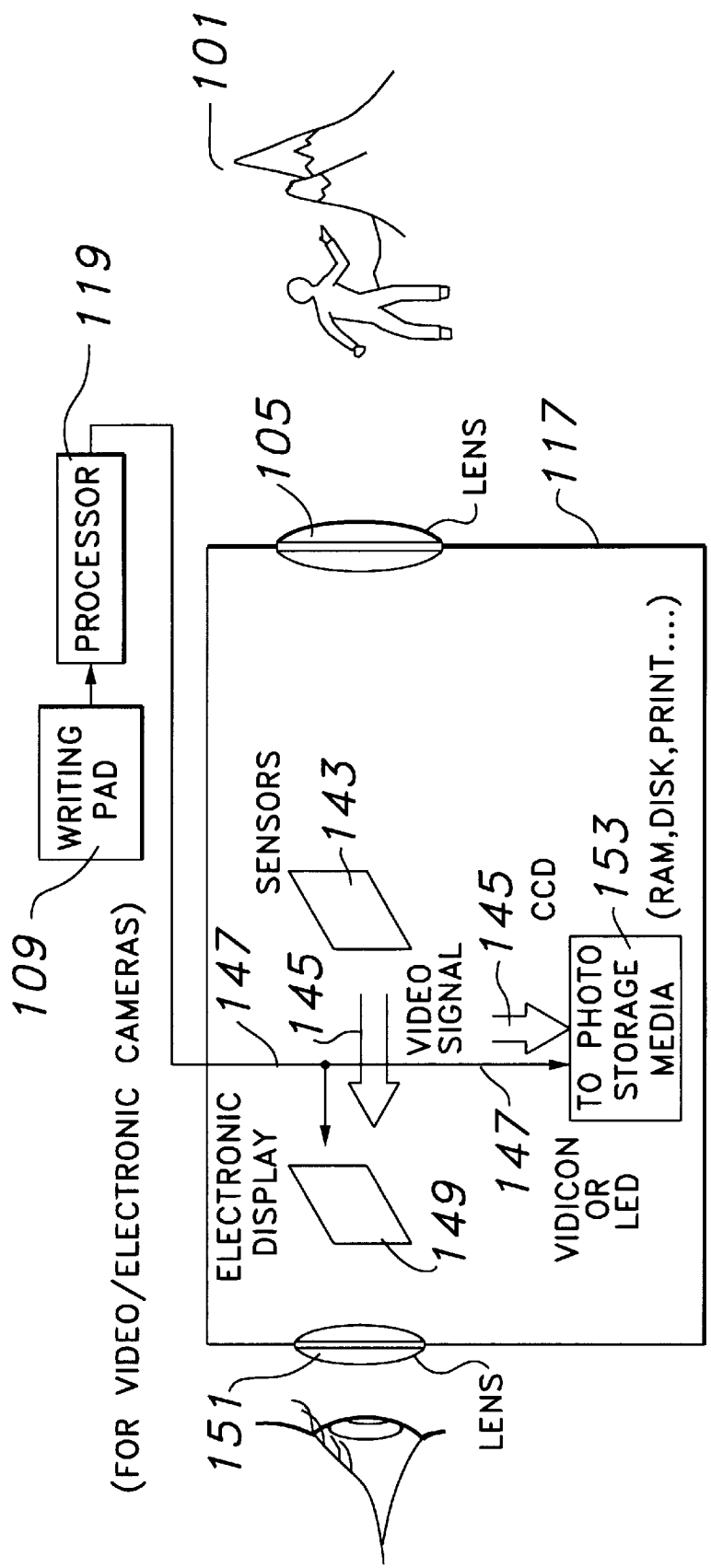
FIG. 5 shows a preferred embodiment for video and other electronic cameras.

FIG. 5. shows the preferred embodiment for video and other electronic cameras. The image of subject 101 is refracted through lens 105 onto light sensitive sensors 143 to produce a video signal 145. A video signal 147, having information about the subject, is created by the user of the camera 117 by entering the information on writing pad 109, as described above in conjunction with FIGS. 1 and 2. The information is output from writing pad 109 into processor 119, wherein it is converted into a video signal 147. Video signals 147 and 145 are input to electronic display 149, whereon the corresponding video images are displayed. The image may be viewed through lens 151.

Video signals 147 and 145 are also transmitted to storage media 153, examples of which are random access memory, disk storage, video tape, and print media.

Figure 6A:
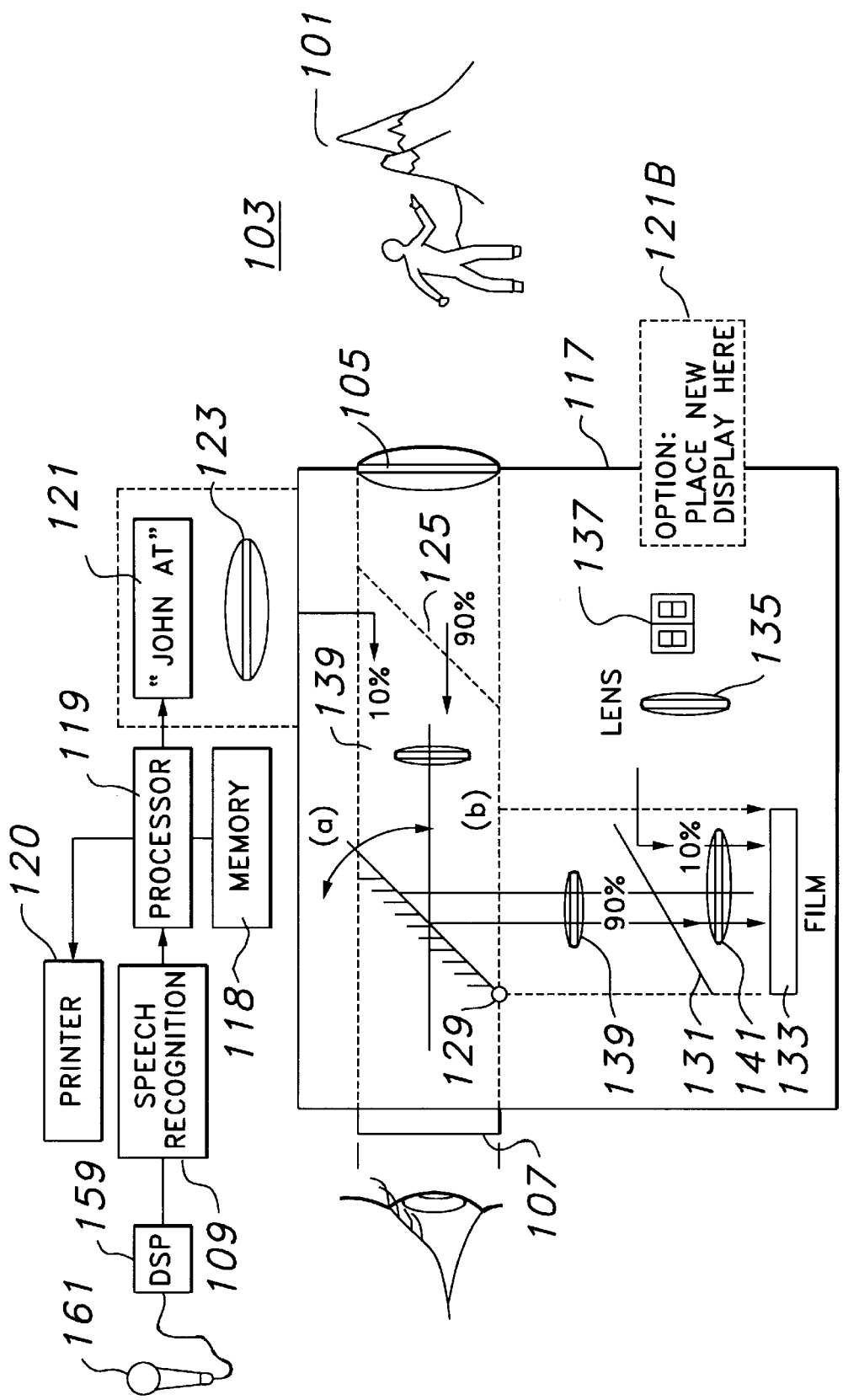
FIGS. 6(A) and 6(B) show alternative embodiments for optical photography cameras.
Figure 6B:
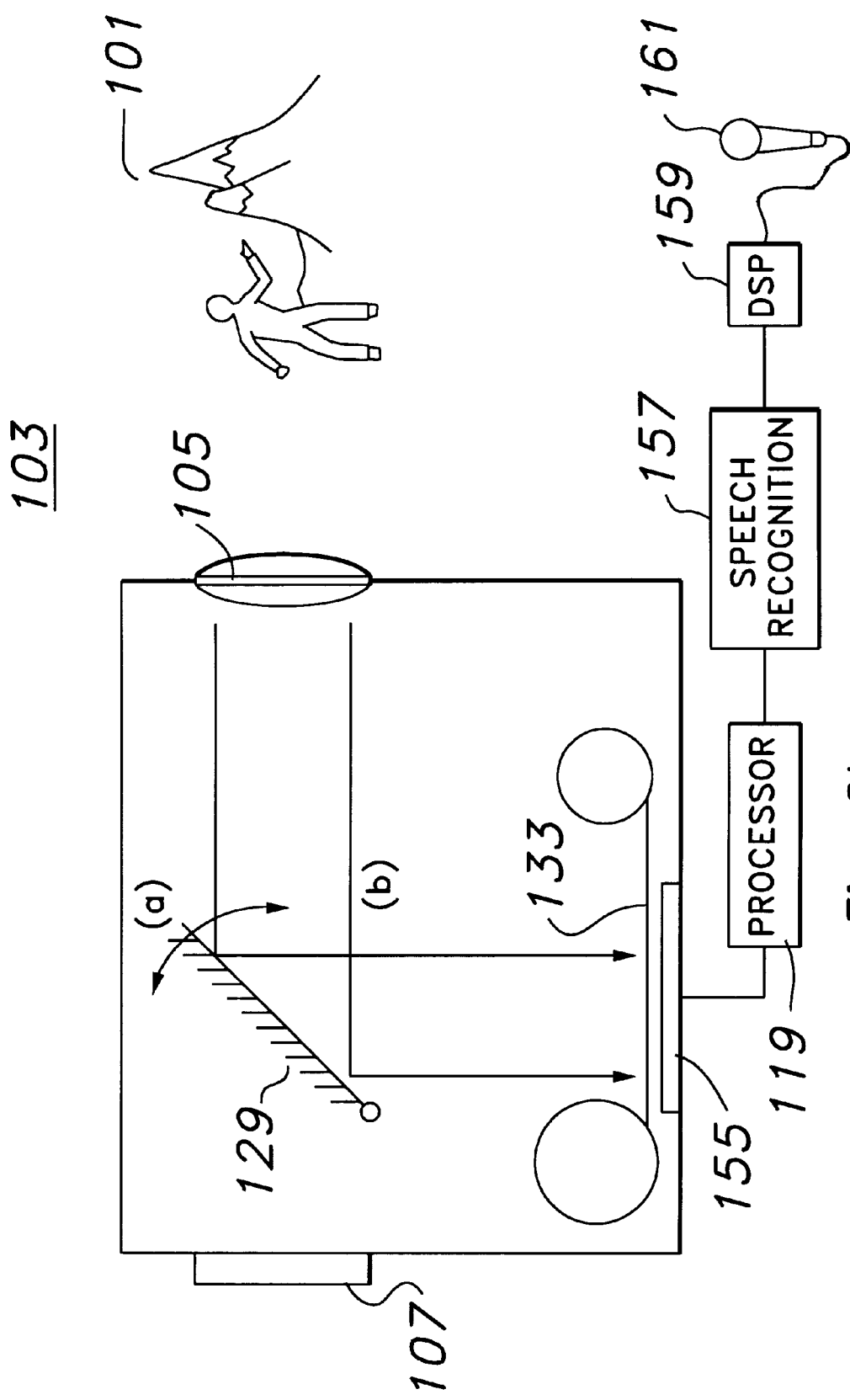
Figure 7:
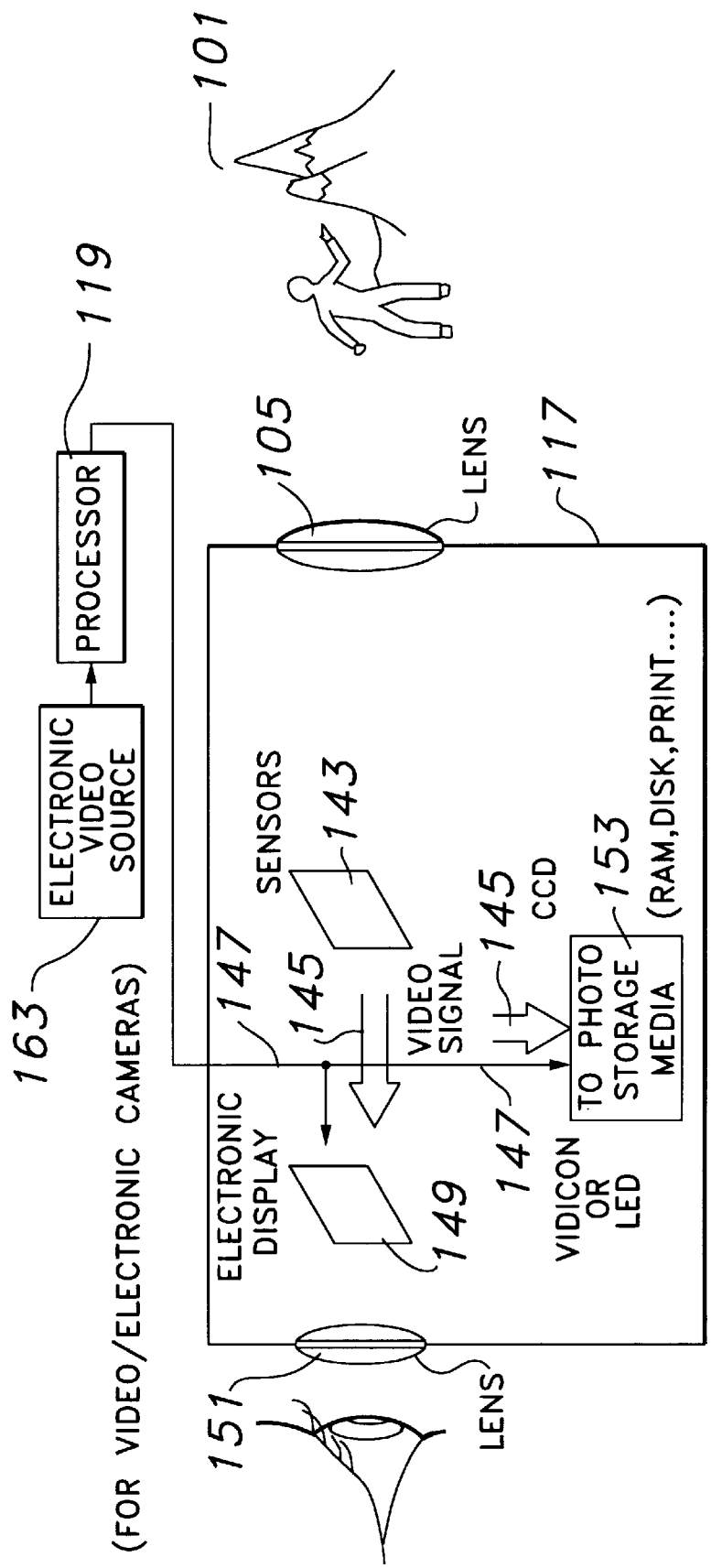
FIG. 7 shows alternative embodiments for video and other electronic cameras.

In alternative embodiments as shown if FIGS. 6 and 7, the writing pad is replaced by either a microphone 161 or a video 163 source. When a microphone is used as the data input source, processor 119 is connected to speech recognition circuitry 157 which is connected to a digital signal processor 159. The microphone 161 is connected to the digital signal processor 159. The speech recognition circuitry 157 is operable to convert the microphone signal to text. The digital signal processors which are programmed to convert spoken words into electronic representations corresponding to the text contained in the spoken words. The operator of the camera records the information to be entered onto the photograph by speaking into the microphone. The processor converts this spoken messages into a textual electronic representation. This text is transmitted to the display and exposed onto the film negative in the manner discussed above in conjunction with FIGS. 4(*a*) and 4(*b*).

A microphone may also be used as an alternative to a writing pad as user-operable input device 109 in the video/electronic camera shown in FIG. 5. In which case, the processor 119 incorporates circuitry for converting information spoken through the microphone into electronic textual representation.

In the alternative embodiment shown in FIG. 7 in which a video source 163 is used in lieu of writing pad 109, the video source 163 may be an electronic camera directed at a text image. The video source may also be a computer memory in which video images are stored. The memory may for example contain images of company logos.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A photographic device capable of placing captions and logos onto images recorded using said photographic device, comprising:

a camera body operable to record an image onto a photographic media;

an electronic writing pad mounted on said camera body, on which a user inputs information to be superimposed onto said image; said writing pad being operable to accept a sketch drawn by user;

said writing pad including a matrix of touch sensitive cells;

a processor for sampling said information on said writing pad for converting said information into display signals which display the information;

a display coupled to said processor and responsive to said display signals for displaying the sketch drawn by user;

an output device attached to said body, responsive to said display, and operable to record said information onto said photographic media, thereby superimposing said information onto said image;

a first lens attached to said body through which a first image is refracted;

a second lens attached to said body through which a second image is refracted, said second image being displayed on said output device; and optical apparatus connected to said body and operable to combine said first image and said second image, thereby producing a third image.

2. The device of claim 1, further comprising:

a film carrier connected to said body and operable to carry a film in front of a location on which said third image is exposed.

3. The device of claim 1, wherein said first image and said second image are substantially the same size.

4. A method for placing user created information onto the picture output from a camera, comprising the steps of:

free handwriting said information on a writing pad being operable to accept a free hand sketch;

translating said information to electronic data signals corresponding to said information;

using said electronic data signals to selectively activate a display so that the display displays a picture corresponding to said information;

refracting light emitted from said display, thereby producing a first set of light rays;

refracting light emitted from a subject, thereby producing a second set of light rays;

combining said first set of light rays and said second set of light rays, thereby producing a third set of light rays; and exposing a film with said third set of light rays.

* * * * *